(12) United States Patent
Isakson

(10) Patent No.: US 11,444,454 B2
(45) Date of Patent: Sep. 13, 2022

(54) RECTIFIER-BASED SURGE PROTECTION CIRCUIT

(71) Applicant: RANTEC POWER SYSTEMS, INC., Los Osos, CA (US)

(72) Inventor: Steve Isakson, Atascadero, CA (US)

(73) Assignee: RANTEC POWER SYSTEMS, INC., Los Osos, CA (US)

( * ) Notice: Subject to any disclaimer, the term of this patent is extended or adjusted under 35 U.S.C. 154(b) by 526 days.

(21) Appl. No.: 15/932,454

(22) Filed: Mar. 7, 2018

(65) Prior Publication Data

US 2019/0348834 A1  Nov. 14, 2019

(51) Int. Cl.
| | |
|---|---|
| *H02H 9/04* | (2006.01) |
| *H02H 9/02* | (2006.01) |
| *B64D 45/02* | (2006.01) |
| *H02M 1/32* | (2007.01) |

(52) U.S. Cl.
CPC ............ *H02H 9/042* (2013.01); *B64D 45/02* (2013.01); *H02H 9/025* (2013.01); *H02H 9/04* (2013.01); *H02H 9/041* (2013.01); *H02M 1/32* (2013.01)

(58) Field of Classification Search
CPC .......... H02H 9/042; H02H 9/025; H02H 9/04; H02H 9/041; H02M 1/32; B64D 45/02
USPC .................................................. 361/91, 91.1
See application file for complete search history.

(56) References Cited

U.S. PATENT DOCUMENTS

| | | | | |
|---|---|---|---|---|
| 5,740,026 A | * | 4/1998 | Karol | ................... H02M 3/1563 |
| | | | | 363/142 |
| 5,754,419 A | * | 5/1998 | Ho | ......................... H02M 3/158 |
| | | | | 363/89 |
| 8,411,403 B2 | * | 4/2013 | Divan | ..................... H02H 9/044 |
| | | | | 361/118 |
| 2006/0171182 A1 | * | 8/2006 | Siri | .................... H02M 3/33592 |
| | | | | 363/131 |

(Continued)

FOREIGN PATENT DOCUMENTS

WO    WO-2019102247 A1 * 5/2019 ............. H02H 9/025

*Primary Examiner* — Thienvu V Tran
*Assistant Examiner* — Sreeya Sreevatsa
(74) *Attorney, Agent, or Firm* — Hickman Becker Bingham Ledesma LLP

(57) ABSTRACT

A surge protection circuit comprises a bridge rectifier having two input terminals coupled to an input source of electricity that may experience highly positively or negatively biased over-voltage and/or over-current, and two output terminals respectively coupled to a voltage surge blocking stage via a first bus line and to a return bus; a current surge protection stage that is series coupled in the first bus line between the voltage blocking stage and a voltage surge detection stage that is disposed between the first bus line and the return bus; two output terminals respectively coupled to the first bus line and the return bus, after the current surge protection stage. Embodiments can protect circuits or apparatus, such as DC-DC converters, that are sensitive to highly positively or negatively biased voltage/current surges by inverting negative pulses associated with a surge and outputting the inverted or rectified over-voltage/over-current to other protection circuitry. During events such as lightning strikes, apparatus such as DC-DC converters are effectively transiently powered by the strike, from which negative bias has been removed and passed through blocking and surge protection stages.

13 Claims, 2 Drawing Sheets

(56) References Cited

U.S. PATENT DOCUMENTS

| | | | | |
|---|---|---|---|---|
| 2013/0100710 A1* | 4/2013 | Kang | ............... | H02H 7/125 |
| | | | | 361/118 |
| 2013/0170085 A1* | 7/2013 | Kim | ............... | H02H 1/04 |
| | | | | 361/91.1 |
| 2017/0179811 A1* | 6/2017 | Knudsen | ............... | H02M 7/04 |
| 2019/0372332 A1* | 12/2019 | Khosla | ............... | H01H 71/12 |

* cited by examiner

RECTIFIER-BASED SURGE PROTECTION CIRCUIT

FIELD OF THE DISCLOSURE

The present disclosure generally provides improvements in the technical field of electronic circuits for electrical protection of other circuits. The disclosure specifically provides improvements in the field of protecting electronic apparatus from damage occurring from unanticipated high-voltage, high-current surges or sources, such as lightning strikes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A lightning strike or any other unanticipated introduction of high voltage electricity can damage or destroy electric or electronic circuits or apparatus. Devices that are installed in aircraft or vehicles that regularly operate outdoors in arbitrary weather conditions may experience a higher frequency of lightning strikes or other events, resulting in injection of high voltage or current differentially into the front-end of sensitive circuits. Lightning in particular may be experienced in a differential mode in which it is presented at only one of the input line and return line of a circuit. The result can be causing input voltage to be extremely high. For power supplies, the effect can be to reverse bias the inputs so that the supply appears to be receiving no input voltage. Therefore, in avionics and other fields, engineers desire to provide some form of protection against voltage surges and current surges that are experienced when lightning strikes an aircraft, vehicle or building. The problem is particularly acute in aircraft in which electronic apparatus may be bonded indirectly or directly to parts of the airframe and therefore electrically coupled almost directly to an inbound lightning strike.

However, past efforts to address lightning protection in aircraft and other environments typically have required apparatus that is costly, large or heavy. There is a need for an improved solid-state circuit for lightning or other voltage/current surge protection that is cost-efficient, compact and simple.

SUMMARY

The appended claims may serve as a summary of the invention.

DETAILED DESCRIPTION

Figure 1:
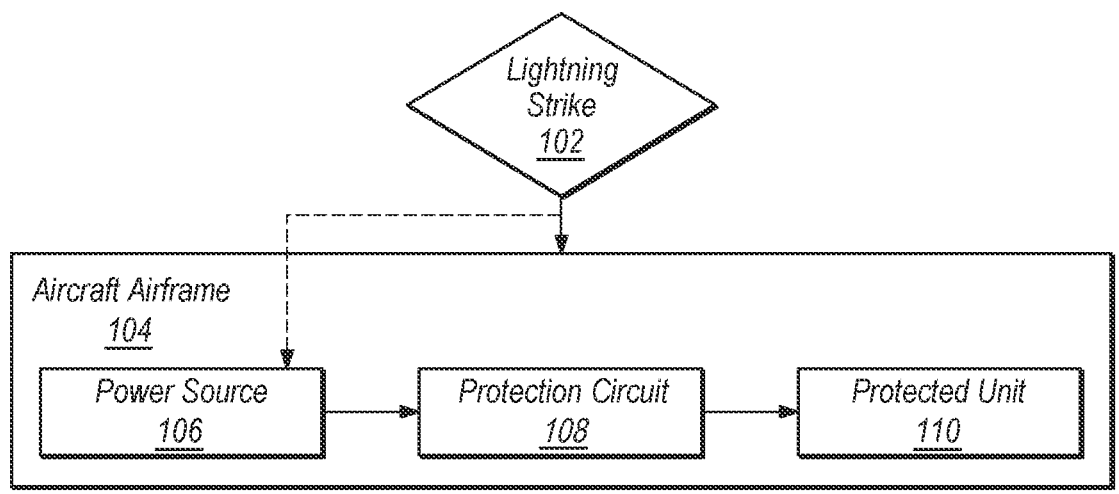
FIG. 1 is a block diagram illustrating an example operating environment for a surge protection circuit.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a surge protection circuit comprises a bridge rectifier having two input terminals coupled to an input source of electricity that may experience highly positively or negatively biased over-voltage and/or over-current, and two output terminals respectively coupled to a voltage surge blocking stage via a first bus line and to a return bus; a current surge protection stage that is series coupled in the first bus line between the voltage blocking stage and a voltage surge detection stage that is disposed between the first bus line and the return bus; two output terminals respectively coupled to the first bus line and the return bus, after the current surge protection stage. Embodiments can protect circuits or apparatus, such as DC-DC converters, that are sensitive to highly negatively biased voltage/current surges by inverting negative pulses associated with a surge and outputting the inverted or rectified over-voltage/over-current to other protection circuitry. During events such as lightning strikes, apparatus such as DC-DC converters are effectively transiently powered by the strike, from which negative bias has been removed and passed through blocking and surge protection stages.

In another embodiment, a surge protection circuit comprises a bridge rectifier having two input terminals coupled to an input source of electricity that may experience highly positively or negatively biased over-voltage and/or over-current, and two output terminals respectively coupled to a voltage surge blocking stage via a first bus line and to a return bus; a current surge protection stage that is series coupled in the first bus line between the voltage blocking stage and a voltage surge detection stage that is disposed between the first bus line and the return bus; a holdup capacitor coupled across the first bus line and the return bus, after the voltage surge detection stage; a bias converter coupled across the first bus line and the return bus, and comprising a positive bias output and a negative bias output, the positive bias output coupled to the voltage surge blocking stage, the positive bias output and negative bias output coupled to the voltage surge detection stage; and two output terminals respectively coupled to the first bus line and the return bus, after the bias converter.

In still another embodiment, a surge protected DC-DC power converter system comprises a DC-DC converter; a bridge rectifier having two input terminals coupled to an input source of electricity that is normally DC voltage and current for the DC-DC converter but that may experience highly positively or negatively biased over-voltage and/or over-current under a surge condition such as a lightning strike, and two output terminals respectively coupled to a voltage surge blocking stage via a first bus line and to a return bus; a current surge protection stage that is series coupled in the first bus line between the voltage blocking stage and a voltage surge detection stage that is disposed between the first bus line and the return bus; a holdup capacitor coupled across the first bus line and the return bus, after the voltage surge detection stage; a bias converter coupled across the first bus line and the return bus, and comprising a positive bias output and a negative bias output, the positive bias output coupled to the voltage surge blocking stage, the positive bias output and negative bias output coupled to the voltage surge detection stage; after the bias converter, two output terminals respectively coupled to the first bus line and the return bus and to inputs of the DC-DC converter.

Example Operating Environment

FIG. 1 is a block diagram illustrating an example operating environment for a surge protection circuit.

In one embodiment, a lightning strike 102 introduces high-voltage, high-current electricity to an aircraft airframe 104 that contains a power source 106, a protection circuit 108, and a protected unit 110. For purposes of illustrating a clear example, aspects of this disclosure refer to a lightning strike 102, but embodiments may be used in operating environments to which a high-voltage, high-current surge or source of electricity is introduced through events or sources other than lightning. For example, embodiments can be used to protect against certain kinds of fault conditions in aircraft, power plants, locomotives, sea-going vessels or other environments that artificially produce high-voltage, high-current sources of electricity from generators.

Aircraft airframe 104 broadly represents a housing, vessel, frame or other enclosure, typically formed of at least one electrically conductive element such as an aluminum skin or ferrous frame member. For purposes of illustrating a clear example, aspects of this disclosure refer to an aircraft airframe 104, but other embodiments may be used in environments other than aircraft.

Power source 106 broadly represents any of a battery, motor and generator, power supply or other source of electricity that is typically generated on board or within the aircraft airframe and regulated. The power source 106 represents an ordinary source of power that is used by other electrical and electronic apparatus within the airframe 104. In one embodiment, power source 106 is a source of direct-current (DC) power.

Figure 2:
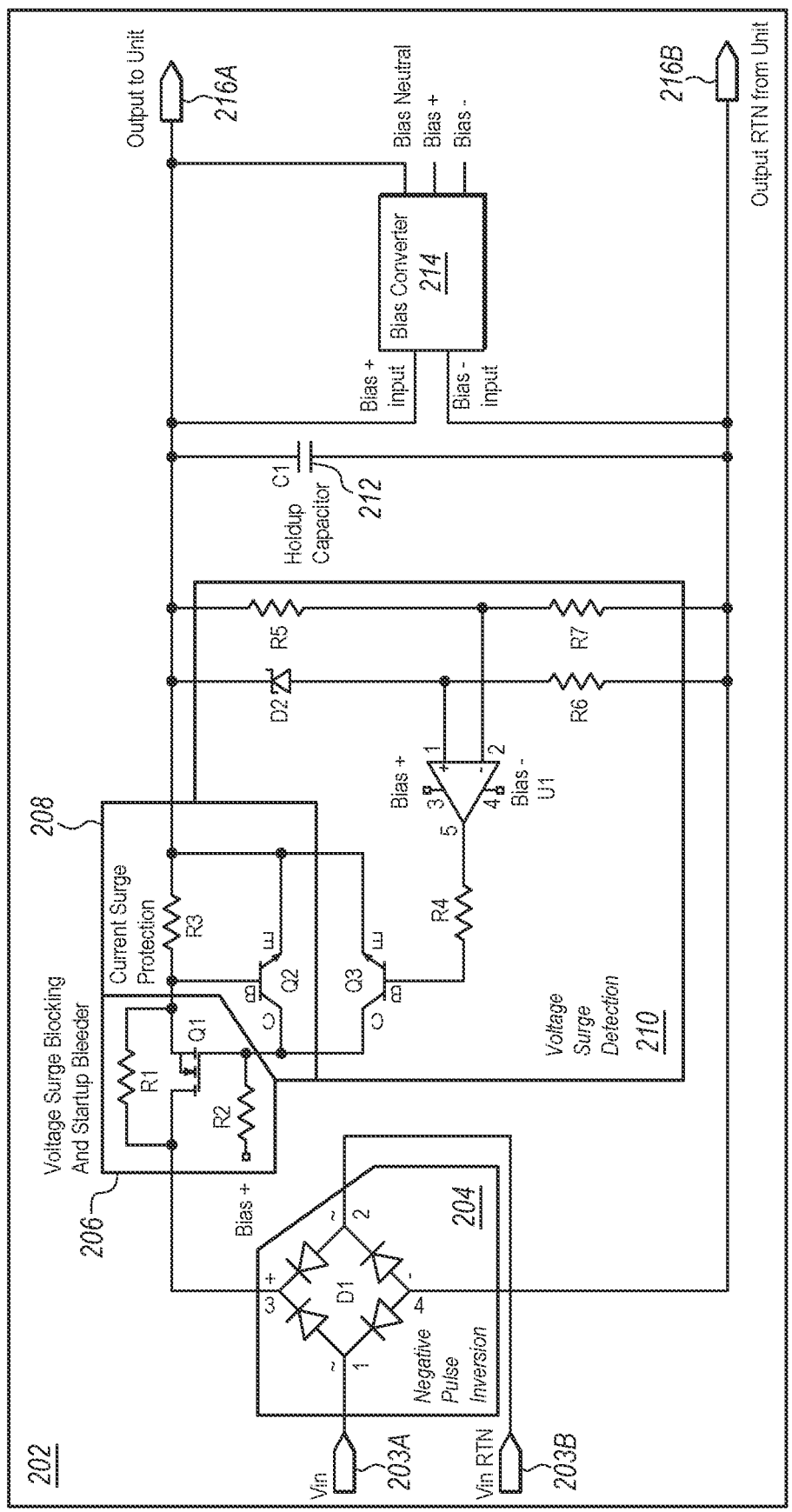
FIG. 2 is a schematic diagram of an example surge protection circuit.

Protection circuit 108 comprises an electronic circuit featuring a bridge rectifier, voltage surge blocking stage, current surge protection stage, voltage surge detection stage, and bias converter, among other elements, as further described herein in connection with FIG. 2. In an embodiment, protection circuit receives DC power from the power source 106.

Protected unit 110 broadly represents any unit of electrical or electronic apparatus for which protection against lightning or other high-voltage, high-current surge or source of electricity is desired. In some embodiments, protected unit 110 may be a DC-DC converter, but the protected unit also may be any element of avionics, a computer or any form of load.

Example Surge Protection Circuit

FIG. 2 is a schematic diagram of an example surge protection circuit.

In an embodiment, a protection circuit 202 generally comprises a bridge rectifier 204, a voltage surge blocking stage 206, a current surge protection stage 208, a voltage surge detection stage 210, a holdup capacitor 212 and a bias converter 214. In an embodiment, input terminals 203A, 203B normally are coupled to the power source 106 (FIG. 1) or another upstream unit of electrical or electronic apparatus. In the face of a surge, input terminals 203A, 203B are first in an electrical path to receive the surge. Output terminals 216A, 216B are coupled beyond the protection circuit to a protected unit such as unit 110 of FIG. 1.

For purposes of illustrating a clear example, the description in this section identifies specific components that can be used in the voltage surge blocking stage 206, current surge protection stage 208, and voltage surge detection stage 210, and describes connections between them to result in describing a complete workable circuit. However, the number, order, nature and arrangement of these specific components are not critical and different, functionally equivalent components or circuits can be substituted for each of the voltage surge blocking stage 206, current surge protection stage 208, and voltage surge detection stage 210. Fundamentally, the disclosure is directed to a bridge rectifier coupled to the voltage surge blocking stage 206, current surge protection stage 208, and voltage surge detection stage 210, holdup capacitor 212 and bias converter 214 but the internal arrangement of specific components of the stages 206, 208, 210, 214 is not critical.

Input terminals 203A, 203B are coupled respectively to two input terminals 1, 2 of the bridge rectifier 204. The rating of bridge rectifier 204 is selected to exceed the voltage and current levels that are expected to be experienced at the input terminals 203A, 203B, after a surge has propagated through the airframe 104 and possibly other elements to reach those terminals, and example values are given in the table below. In an embodiment, bridge rectifier 204 in the face of a negatively biased surge performs pulse inversion resulting in providing a positive DC output at terminals 3, 4. The first positive output terminal 3 of rectifier 204 is coupled as input to the voltage surge blocking stage 206 and the negative output terminal 4 of the rectifier is coupled to an output terminal 216B and other components along a return line or bus, as further described herein.

The voltage surge blocking stage 206 is configured to perform both positive over-voltage blocking and to act as a startup bleeder in the face of a surge. In an embodiment, voltage surge blocking stage 206 comprises resistor R1 coupled from terminal 3 of the rectifier 204 and across the source and drain terminals of a field-effect transistor Q1 and thence to the current surge protection stage 208, which is configured to limit over-current from reaching holdup capacitor 212 downstream. The gate of FET Q1 is coupled via resistor R2 to the positive reference terminal of the bias converter 214 and further coupled to the collector of transistor Q2 in current surge protection stage 208.

Resistor R3 is coupled between the base and emitter of transistor Q2 and further coupled to the emitter of transistor Q3 of voltage surge detection stage 210, which has a collector coupled to the collector of Q2, to bias resistor R2 and FET Q1 of the other stages. The base of transistor Q3 is coupled to resistor R4 and output terminal 5 of an operational amplifier U1 in stage 210. Power supply terminals 3, 4 of op-amp U1 receive reference supply input from respective output terminals of bias converter 214 according to polarity. Non-inverting input terminal 1 of op-amp U1 is coupled via Zener diode D2 to the positive bus side of the circuit through resistor R3 of current surge protection stage 208 and via resistor R6 to the return bus side of the circuit. Inverting input terminal 2 is coupled to the positive bus line and return bus line of the circuit respectively via resistor R5 and R7.

A holdup capacitor 212, also denoted C1, is coupled across the bus lines of the circuit and serves to maintain the output at terminals 216A, 216B within regulation in the face of the surge until restoration to normal operation. The bus lines are further coupled to the bias converter 214 to provide voltage input for production of bias or reference output from the converter; a neutral terminal of the bias converter is coupled to a first output terminal 216A in this instance of the circuit. These output terminals may be coupled to a downstream protected circuit, apparatus or device, such as protected unit 210 of FIG. 1.

In some instances of the circuit, the bias converter might not require both a positive and negative output, but has only been included here for this specific instance. It could also be placed before the other circuits in some cases.

Values or specifications of the foregoing components may be, in one embodiment:

| Component | Example Value |
|---|---|
| C1 | 50 Mf |
| D1 (rectifier 204) | 750 V, 50 A bridge |
| D2 | 6.2 V zener diode |
| U1 | LT1716 op-amp |
| R1 | 10 k$\Omega$ |
| R2 | 20 k$\Omega$ |
| R3 | 20 m$\Omega$ |
| R4 | 10 k$\Omega$ |
| R5 | 5.1 k$\Omega$ |
| R6 | 200 k$\Omega$ |
| R7 | 200 k$\Omega$ |
| Q1 | IXTT12N150HV FET |
| Q2 | 2N2222A |
| Q3 | 2N2222A |

In normal operation, DC voltage arriving at terminals 203A, 203B passes through rectifier 204 unaffected to the positive and return bus lines of the circuit. Bleeder resistor R1 permits voltage and current to flow through R3 to the voltage surge detection stage 210 during startup. Furthermore, FET Q1 is normally closed to permit current flow forward toward protected unit 110.

In the face of a surge applied at terminals 203A, 203B that appears as negative-biased voltage, rectifier 204 will invert any negative pulses and output only positive voltage with respect to ground. Therefore, only positive DC voltage is presented to stages 206, 208, 210 and both the circuit of FIG. 2 and the protected unit 110 can continue to operate. In this manner, electricity arriving from lightning is instantly rectified and simply presented as a continuing DC power source for other elements of the system. While such DC voltage may represent over-voltage, stages 206, 208, 210 are configured to manage that condition. Furthermore, when the protected unit 110 is a power supply or DC-DC converter, that unit will never experience strong reverse-biased voltage or current. If a low positive input voltage is presented, then the holdup circuit, 212, prevents an induce shutdown or other undesirable effects. Thus, embodiments are based upon the fundamental insight that a bridge rectifier provides a simple, inexpensive, reliable and compact way to prevent the injection of unexpected highly negative-biased voltage into a sensitive downstream circuit.

In such an over-voltage situation, voltage surge detection stage 210 drives the gate of Q1 lower using Q3 as a driver transistor, resulting in a pinch-off state of the channel within the FET, thereby becoming an open switch that effectively blocks over-voltage downstream through the circuit while Q2 concurrently snubs over-current. After pinch-off, however, holdup capacitor C1 will discharge into downstream loads such as protected unit 110 to permit adequate time for those loads to continue operation until the surge is removed, gracefully trigger suspension of operation, shutdown or other unit-specific protection.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A surge protection circuit comprising:
    a bridge rectifier having two input terminals coupled to an input source of DC electricity that is subject to experience negatively biased over-voltage and/or over-current, and two output terminals, a first output terminal of the two output terminals coupled to a voltage surge blocking stage via a first bus line and a second output terminal of the two output terminals coupled to a return bus;
    a current surge protection stage that is series coupled in the first bus line between the voltage surge blocking stage and a voltage surge detection stage that is coupled between the first bus line and the return bus;
    wherein the voltage surge blocking stage comprises a transistor having a drain terminal, a source terminal, a channel and a gate terminal, wherein the first bus line is coupled across the source terminal and the drain terminal through the channel of the transistor, and the gate terminal of the transistor is coupled to the voltage surge detection stage;
    a holdup capacitor coupled across the first bus line and the return bus, after the voltage surge detection stage;
    a bias converter coupled across the first bus line and the return bus, and comprising a positive bias output and a negative bias output, the positive bias output coupled to the voltage surge blocking stage, the positive bias output and the negative bias output coupled to the voltage surge detection stage;
    the first output terminal of the two output terminals coupled to the first bus line and the second output terminal of the two output terminals coupled to the return bus, after the bias converter.

2. The surge protection circuit of claim 1, the bridge rectifier operable to invert negative pulses of negatively biased voltage/current surge input during a lightning strike into over-voltage/over-current that is positively biased, said bridge rectifier operable to prevent reverse currents to any of the two input terminals during a positive surge or a negative surge.

3. The surge protection circuit of claim 1, wherein the bridge rectifier has a maximum voltage rating and a maximum current rating that are greater than corresponding over-voltage and over-current values that are experienced at the input terminals during a lightning strike.

4. The surge protection circuit of claim 1, wherein the bridge rectifier has a maximum voltage rating and a maximum current rating that are greater than corresponding over-voltage and over-current values that are experienced at the input terminals during a lightning strike upon an aircraft.

5. The surge protection circuit of claim 1, wherein any over-voltage at the voltage surge blocking stage causes a pinch-off state of the channel of the transistor thereby at least in part blocking any over-voltage from reaching a protected unit that is coupled to two output terminals of the surge protection circuit.

6. A surge protected DC-DC power converter system comprising:
    a DC-DC converter;
    a bridge rectifier having two input terminals coupled to an input source of DC electricity that is normally DC voltage and DC current for the DC-DC converter that is subject to experience positively or negatively biased over-voltage and/or over-current under a surge condition, and two output terminals, a first output terminal of the two output terminals coupled to a voltage surge blocking stage via a first bus line and a second output terminal of the two output terminals coupled to a return bus;
a current surge protection stage that is series coupled in the first bus line between the voltage surge blocking stage and a voltage surge detection stage that is coupled between the first bus line and the return bus;
wherein the voltage surge blocking stage comprises a transistor having a drain terminal, a source terminal, a channel and a gate terminal, wherein the first bus line is coupled across the source terminal and the drain terminal through the channel of the transistor, and the gate terminal of the transistor is coupled to the voltage surge detection stage;
a holdup capacitor coupled across the first bus line and the return bus, after the voltage surge detection stage;
a bias converter coupled across the first bus line and the return bus, and comprising a positive bias output and a negative bias output, the positive bias output coupled to the voltage surge blocking stage, the positive bias output and the negative bias output coupled to the voltage surge detection stage;
after the bias converter, the first output terminal of the two output terminals coupled to the first bus line and the second output terminal of the two output terminals coupled to the return bus and to inputs of the DC-DC converter.

7. The surge protected DC-DC power converter system of claim 6, wherein the bridge rectifier has a maximum voltage rating and a maximum current rating that are greater than corresponding over-voltage and over-current values that are experienced at the input terminals during a lightning strike.

8. The surge protected DC-DC power converter system of claim 6, wherein the bridge rectifier has a maximum voltage rating and a maximum current rating that are greater than corresponding over-voltage and over-current values that are experienced at the input terminals during a lightning strike upon an aircraft.

9. A surge protection circuit comprising:
a bridge rectifier having two input terminals coupled to an input source of DC electricity that is subject to experience negatively biased over-voltage and/or over-current, and two output terminals, a first output terminal of the two output terminals coupled to a voltage surge blocking stage via a first bus line and a second output terminal of the two output terminals coupled to a return bus;
a current surge protection stage that is series coupled in the first bus line between the voltage surge blocking stage and a voltage surge detection stage that is coupled between the first bus line and the return bus;
wherein the voltage surge blocking stage comprises a transistor having a drain terminal, a source terminal, a channel and a gate terminal, wherein the first bus line is coupled across the source terminal and the drain terminal through the channel of the transistor, and the gate terminal of the transistor is coupled to the voltage surge detection stage;
the first output terminal of the two output terminals coupled to the first bus line and the second output terminal of the two output terminals coupled to the return bus, after the current surge protection stage.

10. The surge protection circuit of claim 9, the bridge rectifier operable to invert negative pulses of highly negatively biased voltage/current surge input during a lightning strike into over-voltage/over-current that is normally biased.

11. The surge protection circuit of claim 9, wherein the bridge rectifier has a maximum voltage rating and a maximum current rating that are greater than corresponding over-voltage and over-current values that are experienced at the input terminals during a lightning strike.

12. The surge protection circuit of claim 9, wherein the bridge rectifier has a maximum voltage rating and a maximum current rating that are greater than corresponding over-voltage and over-current values that are experienced at the input terminals during a lightning strike upon an aircraft.

13. The surge protection circuit of claim 9, coupled to a DC-DC converter to provide surge protection of the DC-DC converter from a highly positively or negatively biased over-voltage/over-current source such as a lightning strike.

\* \* \* \* \*